US012763079B2

(12) United States Patent
Jung et al.

(10) Patent No.: US 12,763,079 B2
(45) Date of Patent: Oct. 13, 2026

(54) METHOD, DEVICE AND SYSTEM FOR REAL-TIME SYNTHETIC SPEECH DETECTION IN A RESOURCE-CONSTRAINED ENVIRONMENT

(71) Applicant: Foundation of Soongsil University-Industry Cooperation, Seoul (KR)

(72) Inventors: Souhwan Jung, Seoul (KR); Kihun Hong, Seoul (KR); Xuan Hung Dinh, Seoul (VN)

(73) Assignee: Foundation of Soongsil University-Industry Cooperation, Seoul (KR)

(*) Notice: Subject to any disclaimer, the term of this patent is extended or adjusted under 35 U.S.C. 154(b) by 125 days.

(21) Appl. No.: 18/817,317

(22) Filed: Aug. 28, 2024

(65) Prior Publication Data

US 2026/0045261 A1 Feb. 12, 2026

(30) Foreign Application Priority Data

Aug. 9, 2024 (KR) ........................ 10-2024-0106804

(51) Int. Cl.
*G10L 17/04* (2013.01)
*G10L 17/02* (2013.01)
*G10L 17/26* (2013.01)
*G10L 25/78* (2013.01)

(52) U.S. Cl.
CPC .............. *G10L 17/04* (2013.01); *G10L 17/02* (2013.01); *G10L 17/26* (2013.01); *G10L 25/78* (2013.01)

(58) Field of Classification Search
CPC ......... G10L 17/04; G10L 17/02; G10L 17/26; G10L 25/78
USPC ........................................................... 704/243
See application file for complete search history.

(56) References Cited

U.S. PATENT DOCUMENTS

| | | | | |
|---|---|---|---|---|
| 10,008,209 | B1 * | 6/2018 | Qian | G10L 17/18 |
| 12,039,995 | B2 * | 7/2024 | Wang | G06N 3/044 |
| 12,205,574 | B1 * | 1/2025 | Strimel | G10L 15/063 |
| 12,205,609 | B1 * | 1/2025 | Sargsyan | G06N 20/00 |
| 12,541,689 | B2 * | 2/2026 | Jafari | G06N 3/084 |
| 2016/0078339 | A1 * | 3/2016 | Li | G06N 3/084 706/20 |

(Continued)

FOREIGN PATENT DOCUMENTS

| | | | |
|---|---|---|---|
| JP | 2021-039217 | A | 3/2021 |
| JP | 2021-078012 | A | 5/2021 |
| KR | 10-2024-0009862 | A | 1/2024 |

*Primary Examiner* — Thuykhanh Le
(74) *Attorney, Agent, or Firm* — ZION IP; Byungwoong Park

(57) ABSTRACT

The present disclosure may include a method of training a synthesis speech detection model performed by one or more processors including generating a student model initialized by using a teacher model and at least part of one or more teacher model layers included in the teacher model, dividing learning speech data into a piece or pieces of learning speech section data, detecting a voice activity of first learning speech section data among the piece or pieces of learning speech section data, inputting the first learning speech data into the teacher model and the student model, generating first teacher data from the teacher model and first student data from the student model, and training the student model based on the first teacher data and the first student data.

11 Claims, 5 Drawing Sheets

(56) References Cited

U.S. PATENT DOCUMENTS

2019/0034764 A1* 1/2019 Oh ........ G06F 18/2148
2019/0051290 A1* 2/2019 Li ........ G06N 3/0442
2019/0287515 A1* 9/2019 Li ........ G06N 20/00
2020/0312336 A1* 10/2020 Kang ........ G10L 17/18
2020/0334538 A1* 10/2020 Meng ........ G10L 15/063
2020/0357384 A1* 11/2020 Kim ........ G10L 15/063
2020/0387782 A1* 12/2020 Hegde ........ G06N 3/047
2021/0082398 A1* 3/2021 Hori ........ G06N 3/09
2021/0182489 A1* 6/2021 Barkan ........ G06N 3/09
2021/0224660 A1* 7/2021 Song ........ G06N 3/088
2021/0312907 A1* 10/2021 Moreno ........ G10L 21/0208
2021/0358476 A1* 11/2021 Leone ........ G10L 25/51
2022/0076136 A1* 3/2022 Passban ........ G06N 3/088
2022/0101184 A1* 3/2022 Asif ........ G06N 3/082
2022/0172737 A1* 6/2022 Wang ........ G06N 3/0442
2022/0284891 A1* 9/2022 Park ........ G10L 15/22
2022/0301563 A1* 9/2022 Chang ........ G10L 15/24
2022/0309340 A1* 9/2022 Leal ........ G06N 3/08
2022/0343894 A1* 10/2022 Doutre ........ G06N 3/0442
2022/0392480 A1* 12/2022 Kirichenko ........ G06N 3/0464
2023/0129442 A1* 4/2023 Lim ........ G10L 25/30
704/200
2023/0196030 A1* 6/2023 Buduguppa ........ G06F 40/40
706/45
2023/0351203 A1* 11/2023 Ozay ........ G06N 3/096
2023/0368786 A1* 11/2023 Balasubramanian ........
G10L 15/063
2024/0005648 A1* 1/2024 Bondugula ........ G06N 3/045
2024/0105163 A1* 3/2024 Sun ........ G06N 3/045
2024/0135918 A1* 4/2024 Yang ........ G10L 15/063
2024/0221764 A1* 7/2024 Gu ........ G01S 3/80
2024/0249712 A1* 7/2024 Yao ........ G10L 13/02
2024/0331685 A1* 10/2024 Seagraves ........ G06N 3/045
2024/0338408 A1* 10/2024 Ng ........ G06F 16/635
2024/0338532 A1* 10/2024 Pauli ........ G06F 40/40
2024/0363099 A1* 10/2024 Altaf ........ G10L 15/02
2024/0428776 A1* 12/2024 Kang ........ G06F 3/167
2025/0029614 A1* 1/2025 Looney ........ G06F 21/32
2025/0053748 A1* 2/2025 Fayyaz ........ G06F 40/35
2025/0055942 A1* 2/2025 Nighman ........ H04M 3/568
2025/0060782 A1* 2/2025 Mahmud ........ G06F 18/24
2025/0061340 A1* 2/2025 Turuvekere Sreenivas ........
G06N 20/00
2025/0131325 A1* 4/2025 Garrepalli ........ G06N 3/0495
2025/0166358 A1* 5/2025 Bharaj ........ G06V 10/774
2025/0182778 A1* 6/2025 Schalkwyk ........ G06N 3/098
2025/0190762 A1* 6/2025 Severyn ........ G06F 40/20
2025/0214606 A1* 7/2025 Zhang ........ B60W 60/001
2025/0225627 A1* 7/2025 Rao ........ G06T 5/70
2025/0232775 A1* 7/2025 Chang ........ G10L 17/18
2025/0254375 A1* 8/2025 Khani ........ H04N 21/251
2025/0259075 A1* 8/2025 Crabtree ........ G06F 16/3344
2025/0307648 A1* 10/2025 Nguyen ........ G06N 3/045
2025/0329334 A1* 10/2025 Feng ........ G10L 17/06
2025/0348740 A1* 11/2025 Zheng ........ G06N 3/0895
2025/0356170 A1* 11/2025 Naili ........ G06N 3/0455
2025/0356210 A1* 11/2025 Shamir ........ G06N 3/084
2025/0363996 A1* 11/2025 Bharaj ........ G10L 17/26
2025/0384282 A1* 12/2025 Guo ........ G06N 3/0895
2025/0390723 A1* 12/2025 Fortkort ........ G06N 3/049
2026/0004771 A1* 1/2026 Fukuda ........ G10L 15/063
2026/0019498 A1* 1/2026 Agarwal ........ H04M 3/2281
2026/0030511 A1* 1/2026 Vijayaraghavan ..... G06N 3/096

* cited by examiner

METHOD, DEVICE AND SYSTEM FOR REAL-TIME SYNTHETIC SPEECH DETECTION IN A RESOURCE-CONSTRAINED ENVIRONMENT

STATEMENT REGARDING GOVERNMENT SPONSORED RESEARCH OR DEVELOPMENT

The present disclosure was developed in the task of a project to develop Intelligent Cyber Threat Response Technology Development and Human Resource Training ('24) (Project Number: 202324841894, Government Project Identification Number: 1711193570, Name of Project Management (Professional) Organization: Information and Communications Planning and Evaluation Institute, Name of Project Carrying Out Organization: Soongsil University Industry-Academic Cooperation Foundation, Contribution Rate: 1/2)

The present disclosure was developed in the task of a project to develop Development of AI-based Forged Speech Detection System Resilient to Adversarial Attacks ('24) (Project Number: 202324841971, Government Project Identification Number: 1711198225, Name of Project Management (Professional) Organization: Information and Communications Planning and Evaluation Institute, Name of Project Carrying Out Organization: Soongsil University Industry-Academic Cooperation Foundation, Contribution Rate: 1/2)

Meanwhile, in all the aspects of the inventive concept, there is no property interest in the government of the Republic of Korea.

CROSS-REFERENCE TO RELATED APPLICATIONS

This application claims priority under 35 U.S.C. § 119 to Korean Patent Application No. 10-2024-0106804 filed on Aug. 9, 2024, in the Korean Intellectual Property Office, the disclosures of which are incorporated by reference herein in their entireties.

BACKGROUND

Embodiments of the present disclosure described herein relate to a method for detecting synthesis speech, and more particularly, relate to a method for providing a synthesis speech detection function having a real-time nature under a computing resource-constrained environment by using a knowledge distillation technique.

A synthesis speech technology using a deep learning technique is rapidly advancing. Nowadays, the synthesis speech technology is almost indistinguishable from real human speech. It is possible to synthesize the voice of a real person by using the synthesis speech technology. In particular, videos with malicious intent that are synthesized to resemble real people's voices and images are called deepfakes. These deepfake videos are being used to manipulate public opinion through the creation of fake news and for criminal activities such as voice phishing, thereby causing social problems.

Nowadays, machine learning-based techniques have been proposed to detect synthesis speech. A model such as XLS-R has been proposed and has shown good performance in detecting synthesis speech. However, the models currently proposed are too large to be used in widely used edge devices and/or end-user devices such as smartphones. For example, the XLS-R-based model includes over 300 million parameters. As a result, it is difficult to deploy the XLS-R-based model on devices with computing resources of a limited level.

Moreover, models thus currently proposed require speech data detected for a long time to detect synthesis speech, which hinders the real-time nature for detecting synthesis speech. Considering that deepfake voices require immediate detection to prevent harm from occurring, synthesis speech detection techniques with better real-time natures are needed.

Accordingly, there is a need for a technology for detecting synthesis speech in real time under a computing resource-constrained environment.

SUMMARY

Embodiments of the present disclosure provide a method, a device, and a system for real-time synthetic speech detection having real-time natures under limited computing resources.

Problems to be solved by the present disclosure are not limited to the problems mentioned above, and other problems not mentioned will be clearly understood by those skilled in the art from the following description.

According to an embodiment, the present disclosure discloses a training method of a machine learning model for detecting synthesized speech in real time on a device with limited computing resources, such as a smart phone, a wearable device, and/or an edge device, and a synthesis speech detection system including a device for detecting synthesis speech by operating a machine learning model trained according to the training method in an end-to-end method. In an embodiment of the present disclosure, knowledge distillation is performed from a large teacher model that has already been trained to a student model, thereby achieving training of a student model lighter than the teacher model. To make the student model lighter than the teacher model, the student model may be configured to have the smaller number of layers than the teacher model, and may be initialized by using parameters of the teacher model. At this time, initial layers of the teacher model that trains low-dimensional features may be used.

Moreover, to increase the real-time nature of synthesis speech detection, the present disclosure may provide speech data provided to a synthesis speech detection model in a streaming method, and may also configure the length of speech data provided in the streaming method to be shorter. Furthermore, the speech data provided in the streaming method may include pieces of unit section speech. The data input to a model may be configured to be robust to local changes in the speech data, by configuring the speech data provided by using a sliding window method. Besides, in an embodiment, a voice activity may be detected for each individual unit section of speech data provided in the streaming method, and whether there is the voice activity in speech section data provided to a model may be detected by using the detected voice activity result. Preferably, the possibility of model malfunction due to noise or silence may be reduced by providing only speech data with the detected voice activity to the model for training and inference.

Also, when detecting whether input speech data is synthesized, by using a synthesis speech detection model whose the training is completed, the present disclosure may generate section detection information about whether speech is synthesized for each of pieces of input speech section data, and may finally provide synthesis speech detection data for the input speech data by using an average or the like. In addition, synthesis speech detection data robust to momentary noise may be generated by changing the input speech section data in which the synthesis speech detection data is provided in a movement average method (a sliding window manner).

According to an embodiment, a method of training a synthesis speech detection model performed by one or more processors includes generating a student model initialized by using a teacher model and at least part of one or more teacher model layers included in the teacher model, inputting learning speech data into the teacher model and the student model, generating teacher extraction data from the teacher model and student extraction data from the student model, and training the student model based on the teacher extraction data and the student extraction data.

Moreover, the generating of the student model may include initializing a weight of a first student model layer included in the student model to a weight of a first teacher model layer.

Furthermore, the student model may have a number of layers fewer than the teacher model.

Also, a number of student model layers included in the student model may be smaller than or equal to ¼ of a number of teacher model layers included in the teacher model.

Besides, the teacher extraction data may include one or more teacher model layer embeddings and teacher model detection data, and the student extraction data may include one or more student model layers embeddings and student model detection data.

In addition, the training of the student model may include generating a loss function value for the learning speech data. The loss function value may be determined based on similarity between the one or more teacher model layer embeddings and corresponding student model layer embeddings and similarity between the teacher model detection data and the student model detection data.

Moreover, the similarity between the one or more teacher model layer embeddings and corresponding student model layer embeddings may include at least one of L1-norm, L2-norm or cosine similarity.

Furthermore, the similarity between the teacher model detection data and the student model detection data may include a knowledge distillation loss between the teacher model detection data and the student model detection data.

Also, the method may further include determining a student model, whose training is completed by the training of the student model, as the synthesis speech detection model.

According to an embodiment, a synthesis speech detection system includes a synthesis speech detecting device. The synthesis speech detecting device includes a first processor, a first display, and a first memory including a pre-trained synthesis speech detection model. The first processor generates synthesis speech detection data of input speech data by using the pre-trained synthesis speech detection model, and allows the generated synthesis speech detection data to be displayed through the first display.

Besides, the pre-trained synthesis speech detection model may be processed in an end-to-end method within the synthesis speech detecting device composing of a single device.

In addition, the generating of the synthesis speech detection data by the processor may include dividing the input speech data into input speech section data including a piece or pieces of unit speech section data, generating unit section voice activity data for each of the piece or pieces of unit speech section data, and detecting a voice activity of the input speech section data by using the piece or pieces of unit speech section data.

Moreover, a length of the unit speech section data may be 0.7 seconds or less.

Furthermore, the generating of the synthesis speech detection data by the processor may include generating pieces of input speech section data by dividing the input speech data in a sliding window method, generating pieces of section synthesis detection data for the pieces of input speech section data, respectively, and generating synthesis speech detection data of the input speech data by using a movement average of the generated pieces of section synthesis detection data.

Also, a length of the input speech section data may be 2.1 seconds or less.

Besides, the synthesis speech detection system may further include a synthesis speech detection model training device. The synthesis speech detection model training device may include a second processor and a second memory including a teacher model and a student model. The second processor generates the student model initialized by using the teacher model and at least part of one or more teacher model layers included in the teacher model, inputs learning speech data into the teacher model and the student model, generates teacher extraction data from the teacher model and student extraction data from the student model, and trains the student model based on the teacher extraction data and the student extraction data.

BRIEF DESCRIPTION OF DRAWINGS

The above and other objects and features will become apparent from the following description with reference to the following figures, wherein like reference numerals refer to like parts throughout the various figures unless otherwise specified, and wherein.

DETAILED DESCRIPTION OF EXEMPLARY EMBODIMENTS

Hereinafter, embodiments of the present disclosure will be described in detail with reference to the accompanying drawings. However, the present disclosure is not intended to be limited or restricted by embodiments. Unless otherwise defined, all terms (including technical and scientific terms) used in the specification should have the same meaning as commonly understood by those skilled in the art to which the present disclosure pertains, but which may vary according to the intent or precedent of those practicing in the art, the emergence of new technology, and the like.

Moreover, terms, such as those defined in commonly used dictionaries, should not be interpreted in an idealized or overly formal sense unless expressly so defined herein. Terms arbitrarily selected by the applicant of embodiments may also be used in a specific case. In this case, the detailed meanings are given in the corresponding description. Hence, these terms used in the present disclosure may be defined based on their meanings and the contents of the present disclosure, not by simply stating the terms.

Figure 1:
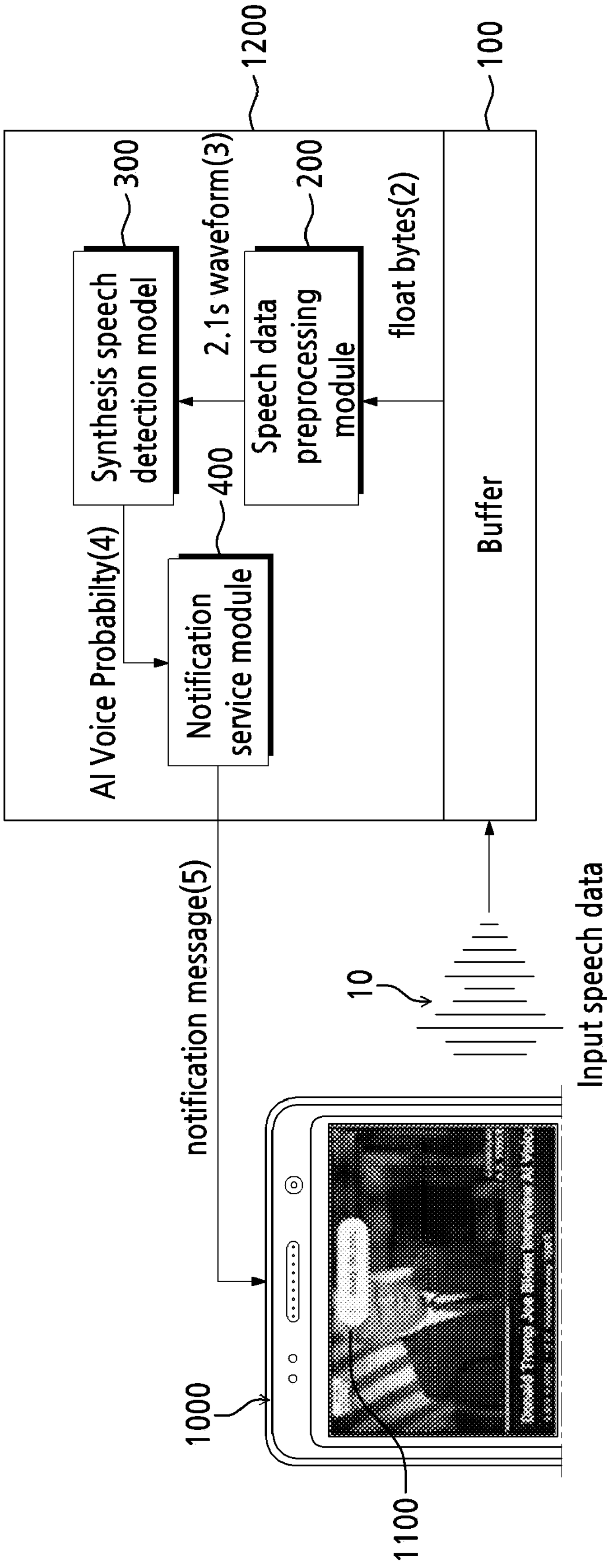
FIG. 1 is a conceptual diagram conceptually illustrating an operation of a synthesis speech detecting device, according to some embodiments of the present disclosure.

FIG. 1 is a conceptual diagram conceptually illustrating an operation of a synthesis speech detecting device, according to some embodiments of the present disclosure.

Referring to FIG. 1, a synthesis speech detecting device 1000 according to some embodiments of the present disclosure may receive speech data and may generate data regarding whether the received speech data is synthesized speech. The synthesis speech detecting device 1000 may execute software and/or applications related to receiving the speech data, and may receive input speech data 10 from the executed software. The received input speech data 10 may be synthesis speech or non-synthesis speech. When the received input speech data 10 is determined to be synthesis speech, the synthesis speech detecting device 1000 may provide, through a voice or a display, information about whether the input speech data 10 is synthesized. For example, as shown in FIG. 1, synthesis speech detection data 1100 of the voice received from the application currently running on the synthesis speech detecting device 1000 may be displayed through a display unit. In this case, the synthesis speech detection data 1100 may be provided in various forms, such as whether the speech data is synthesized, or the probability that it is synthesized. The providing of synthesis speech detection information of speech data under an actual usage environment is described in detail with reference to FIG. 4.

Returning to FIG. 1, the input speech data 10 according to some embodiments of the present disclosure may be delivered to a synthesis speech detection and notification module 1200 stored within the synthesis speech detecting device 1000. As illustrated in FIG. 1, the synthesis speech detection and notification module 1200 may include one or more modules that determine whether the input speech data 10 received from the application is synthesis speech, and notifies a user of the determined result through the synthesis speech detecting device 1000. In an embodiment, the synthesis speech detection and notification module 1200 may be loaded onto a disk and/or memory within the synthesis speech detecting device 1000 and may be processed by a processor. In an embodiment, the processing of the input speech data 10 by the synthesis speech detection and notification module 1200 may be performed in an end-to-end manner within the synthesis speech detecting device 1000. That is, the detection of the synthesis speech may be entirely performed within the synthesis speech detecting device 1000.

Hereinafter, the operation of the synthesis speech detection and notification module 1200 is described in order.

In some embodiments, the received input speech data 10 may be delivered to a buffer 100. In some embodiments, the buffer 100 may refer to a memory space allocated within the memory of the synthesis speech detecting device 1000 and may store the input speech data 10 received before the input speech data 10 is processed.

The input speech data 10 received through the buffer 100 may be delivered to a speech data preprocessing module 200. In an embodiment, the speech data preprocessing module 200 may be a module implemented by software, hardware, and/or a combination thereof that processes the input speech data 10 such that a synthesis speech detection model 300 is capable of processing the input speech data 10. In still another embodiment, the speech data preprocessing module 200 may be a module that detects valid voice activities within the input speech data 10 and provides the synthesis speech detection model 300 with only the speech data in which valid voice activities are detected. Accordingly, speech data without meaningful voice activities, such as noise or silence, may not be provided to the synthesis speech detection model 300, and thus the accuracy of the synthesis speech detection data may be improved. A method in which the speech data preprocessing module 200 detects voice activities is described in detail with reference to FIG. 3.

Returning to FIG. 1, speech data preprocessed by the speech data preprocessing module 200 may be delivered to the synthesis speech detection model 300. In some embodiments, the synthesis speech detection model 300 may be a model implemented by using software, hardware, and/or a combination thereof that provides, as an output, information about whether the delivered speech data is synthesis speech. For example, the synthesis speech detection model 300 may output the probability that the input speech data 10 is a synthesis speech, or may output detection data regarding whether the input speech data 10 is a synthesis speech. In an embodiment, the synthesis speech detection model 300 may be implemented by using a pre-trained machine learning model. Preferably, the synthesis speech detection model 300 may be a machine learning model lightened to operate under a computing resource-constrained environment, and the number of weights included in the model may be limited. The method for training and implementing the synthesis speech detection model 300 are described in detail later with reference to FIG. 2.

The synthesis speech detection information output from the synthesis speech detection model 300 may be delivered to a notification service module 400 that delivers a message regarding detection data to the outside of the synthesis speech detection and notification module 1200. In an embodiment, the notification service module 400 may transmit information about synthesis speech detection data to the external process of the synthesis speech detection and notification module 1200. For example, the notification service module 400 may generate a message and may transmit information to the outside of the synthesis speech detection and notification module 1200. The information delivery method of the notification service module 400 is not limited to the above-described example, and all methods for delivering data between processes may be used.

The message delivered to the outside process of the synthesis speech detection and notification module 1200 by the notification service module 400 may be delivered to a user by being output by using an output device such as the display or voice of the synthesis speech detecting device 1000.

Figure 2:
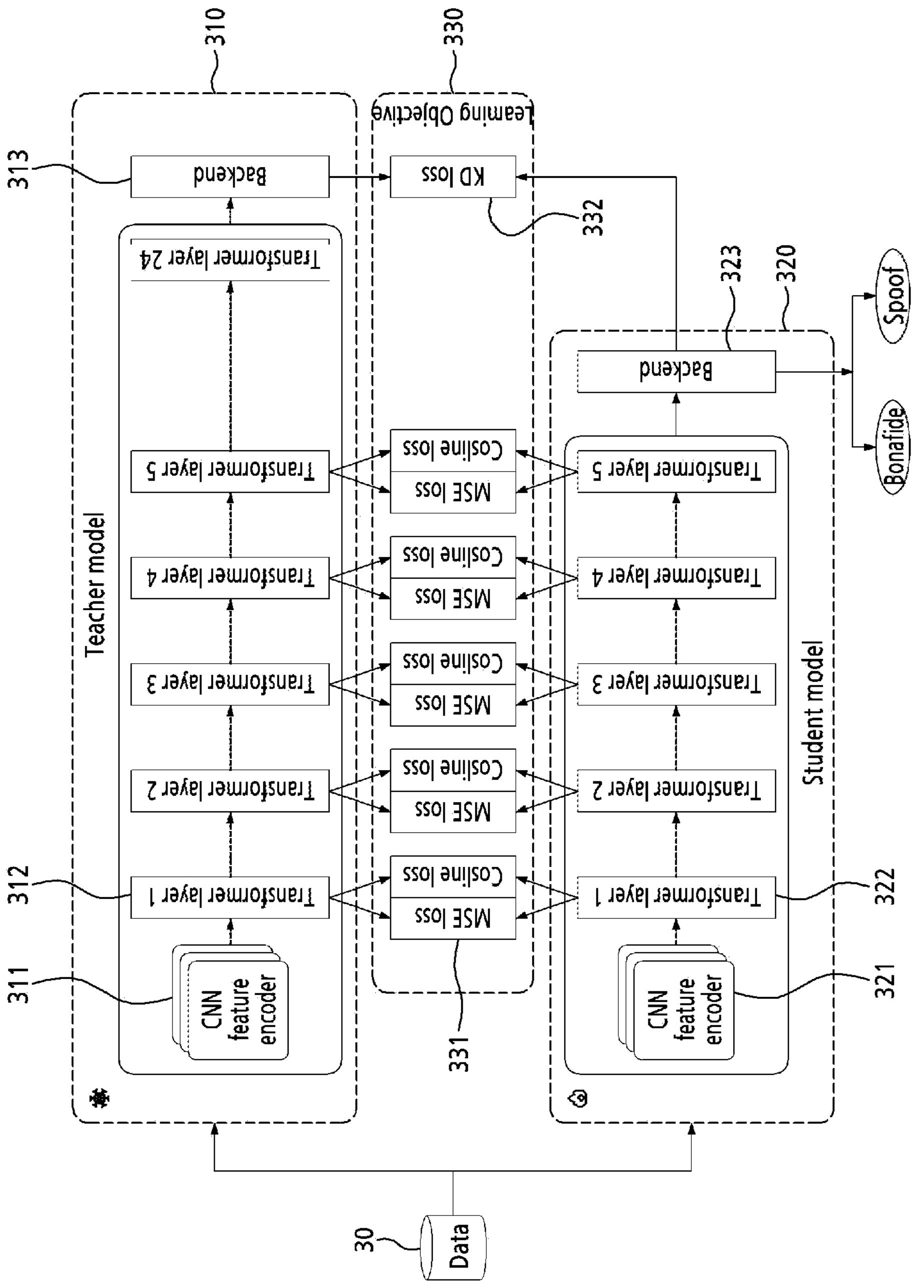
FIG. 2 is a conceptual diagram illustrating a training method of a synthesis speech detection model, according to some embodiments of the present disclosure.

FIG. 2 is a conceptual diagram illustrating a training method of a synthesis speech detection model, according to some embodiments of the present disclosure.

According to FIG. 2, training of a synthesis speech detection model according to some embodiments of the present disclosure may utilize a method of performing knowledge distillation to train a student model 320 by using a teacher model 310. In an embodiment, the student model 320 trained from the teacher model by using the knowledge distillation technique may include the knowledge of the teacher model 310 while being configured as a lightweight model having fewer parameters than the teacher model 310. In a preferred embodiment of the present disclosure, the student model 320, on which the training is completed, may be determined as a synthesis speech detection model for performing a synthesis speech detection method according to an embodiment of the present disclosure. The training process of the synthesis speech detection model is described in detail with reference to FIG. 2 below.

Referring to FIG. 2, the student model 320 according to some embodiments of the present disclosure may include a student feature extraction layer 321, one or more student model layers 322, and a student detection data generation layer 323. The student model 320 may operate to output whether learning speech data is synthesized, by extracting features of the input data by using the student feature extraction layer 321, sequentially passing them through the one or more student model layers 322, and inputting embedding finally extracted from the one or more student model layers into the student detection data generation layer 323.

In FIG. 2, the student feature extraction layer 321 may be a module for extracting features of learning speech data. In an embodiment, the student feature extraction layer 321 may be a layer that extracts features of learning speech data by using hand-crafted features. In another embodiment, the student feature extraction layer 321 may be a model built by using machine learning, preferably deep learning. In an embodiment, the student feature extraction layer 321 may be a model capable of being trained to extract features of input learning speech data, such as a convolutional neural network (CNN) or a vision transformer.

Referring to FIG. 2, the student feature extraction layer 321 according to some embodiments of the present disclosure may be initialized at the training time. In some embodiments, the student feature extraction layer 321 may be initialized with an arbitrary weight. In some other embodiments, the student feature extraction layer 321 may be initialized with a weight of a teacher feature extraction layer 311. In some embodiments, the weights of the teacher feature extraction layer 311 and the student feature extraction layer 321 may be frozen during the training process. In another embodiment, the weight of the student feature extraction layer 321 may be changed by being fine-tuned during the training process.

Returning to FIG. 2, the student model 320 according to some embodiments of the present disclosure may include the one or more student model layers 322. In some embodiments, the student model layer 322 may be a module that receives feature data extracted from the student feature extraction layer 321 and generates embedding for expressing speech data. Preferably, the student model layer 322 may be implemented by using a machine learning technique. In an embodiment, the student model layer 322 may be implemented by using a machine learning model for speech and/or natural language processing. In a preferred embodiment, the student model layer 322 may be implemented by using a transformer layer. For example, each of the student model layers 322 may include an encoder module of one or more transformers. Preferably, each of the student model layers 322 may be a transformer encoder module.

In an embodiment, each of the student model layers 322 may correspond to a specific teacher model layer 312. For example, a specific student model layer may be initialized by using the weight of a teacher model layer corresponding thereto. Moreover, the embedding output from the specific student model layer may be compared with the embedding of the teacher model layer corresponding thereto. Referring to FIG. 2, the student model layer 322 may correspond to the teacher model layer 312. In this case, the weight of the student model layer 322 may be initialized by using the weight of the teacher model layer 312. The similarity may be achieved by comparing between the embedding output from the student model layer 322 and the embedding output from the teacher model layer 312 by using various measures.

In some embodiments, the student model 320 may have fewer layers than the teacher model 310. In an embodiment, the student model 320 may have the number of student model layers smaller than or equal to the predetermined number. Preferably, the student model 320 may have five or fewer student model layers. In another embodiment, the number of student model layers may be determined as a ratio of the number of teacher model layers. Preferably, the number of student model layers may be determined to be smaller than or equal to ¼ of the number of teacher model layers.

In some embodiments, the weight of the teacher model layer 312 may be frozen during the training process. In this case, the student model layer 322 may change from the initial weight through the fine-tuning process.

In an embodiment, the teacher model and the student model may be constructed to process speech data. When the speech data is processed by using a machine learning model with multiple layers, it is possible to output feature information about low-dimensional features (i.e., acoustic features) of the speech data in a layer forming a front end of the model, and feature information about high-dimensional features (e.g., context, a relationship between words, the meaning of a sentence) of the speech data in a layer forming the back end of the model. Accordingly, when information is to be extracted from the acoustic features of the speech data, it is possible to achieve model weight reduction by using the relatively small number of layers while performance is maintained. For example, when the teacher model is a speech processing model such as XLS-R, the acoustic features may be extracted from layers forming the front end. Based on this, a lightweight student model for processing the acoustic features may be constructed by initializing part of the front end layer of the teacher model to a student model.

Returning to FIG. 2, the student model 320 may include the student detection data generation layer 323 that generates information about whether the input speech data is synthesized speech. In an embodiment, the student detection data generation layer 323 may be implemented by using a machine learning model. Preferably, the student detection data generation layer 323 may be implemented by using a feed-forward network and/or a multilayer perceptron. Alternatively, the student detection data generation layer 323 may be implemented by using a support vector machine (SVM), etc. In some embodiments, detection data generated through the student detection data generation layer 323 may include information about whether part or all of the speech data is synthesized. In an embodiment, the information about whether part or all of the speech data is synthesized may be expressed by using logit and/or probability. Furthermore, the student detection data generation layer 323 may also generate a classification result regarding whether speech data is synthesized, based on information about logit and/or probability.

Like other layers in the model, the student detection data generation layer 323 according to some embodiments of the present disclosure may be initialized with an arbitrary weight or may be initialized by using the weight of a teacher detection data generation layer 313.

In some embodiments of the present disclosure, a loss function 330 for training the student model 320 may be implemented by using an inter-embedding loss 331 and/or an inter-detection data loss 332. Preferably, the loss function 330 may use both the inter-embedding loss 331 and the inter-detection data loss 332.

In an embodiment, the inter-embedding loss 331 may use the similarity between embeddings from the teacher model layer 312 and embeddings from the student model layer 322 corresponding thereto. When there are the plurality of student model layers 322, all of a plurality of inter-embedding losses may be used in the loss function 330. In an embodiment, the similarity used in the inter-embedding loss 331 may be L1-norm, L2-norm, and/or cosine similarity. Preferably, the inter-embedding loss 331 may include mean a squared error (MSE) loss and a cosine similarity loss.

In some embodiments, the inter-detection data loss 332 may be based on the similarity between teacher detection data generated by the teacher detection data generation layer 313 and student detection data generated by the student detection data generation layer 323. In an embodiment, the inter-detection data loss 332 may include a measure expressing the similarity between logit or probability distributions generated as detection data. In a preferred embodiment, the inter-detection data loss 332 may include a cross-entropy loss and/or a knowledge distillation loss. As a desirable example of the knowledge distillation loss, KL-Divergence may be used.

In some embodiments, learning speech data 30 used in the training process may include both synthesis speech and non-synthesis speech. In an embodiment, the learning speech data 30 may include only speech data in which voice activities are detected by the speech data preprocessing module.

As described above, after training is completed, the synthesis speech detection model may be built by using only the student model 320. In this case, the synthesis speech detection model built by using the student model after the training is completed may receive part or all of the input speech data. Preferably, a segmented section or a plurality of sections, which are obtained by dividing input speech data, may be input to the synthesis speech detection model.

Figure 3:
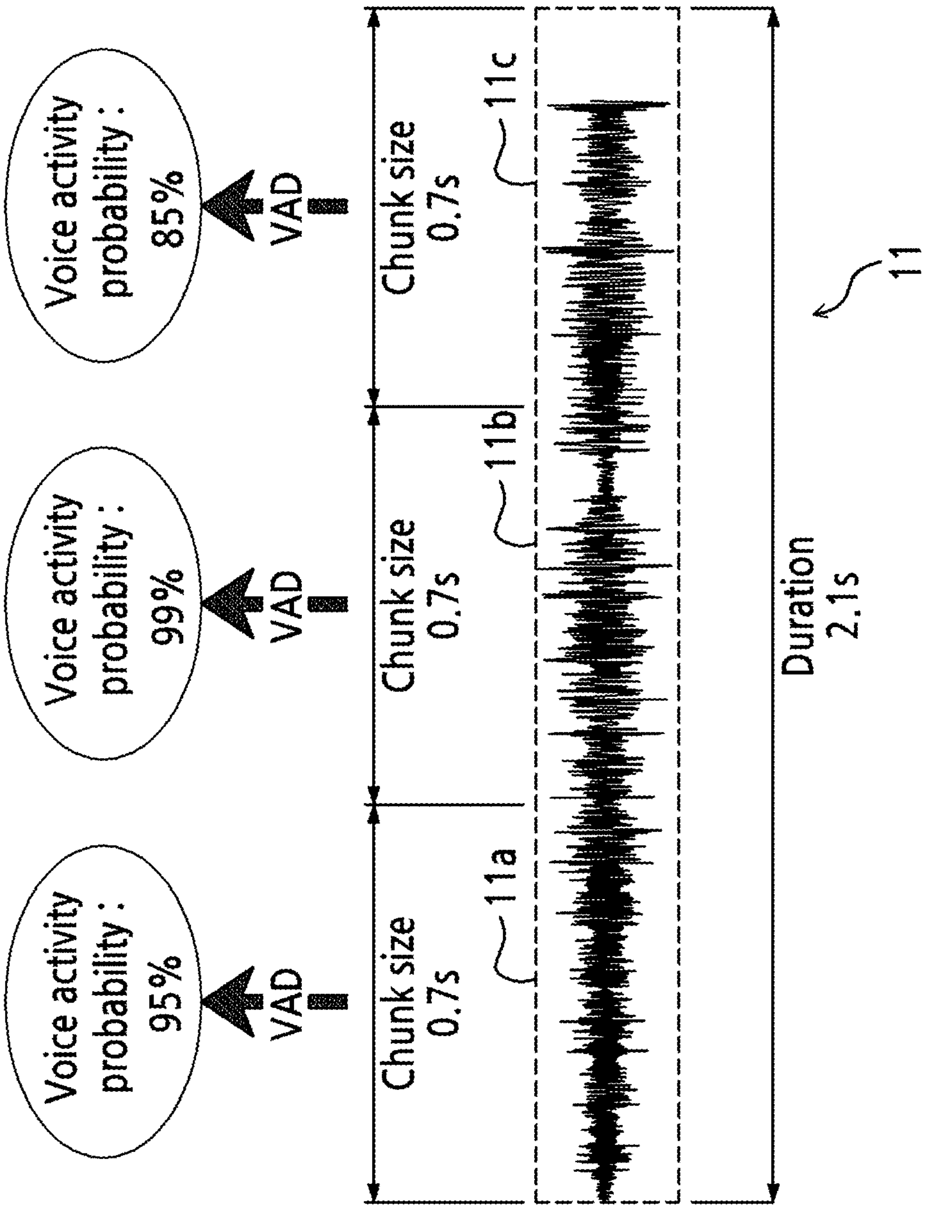
FIG. 3 is a conceptual diagram illustrating a process of detecting voice activities from speech section data, according to some embodiments of the present disclosure.

FIG. 3 is a conceptual diagram illustrating a process of detecting voice activities from speech section data, according to some embodiments of the present disclosure.

Referring to FIG. 3, in some embodiments of the present disclosure, speech data may be divided into a piece or pieces of speech section data 11. In an embodiment, the speech section data 11 may include a piece or pieces of unit speech section data. Preferably, the unit speech section data may be the smallest unit section data of speech data, which is capable of being divided. In the example of FIG. 3, the speech section data 11 is illustrated as including first unit speech section data 11*a*, second unit speech section data 11*b*, and third unit speech section data 11*c*, but the number of unit speech sections included in the speech section data 11 may be greater or smaller than 3.

In some embodiments, the voice activity detection (VAD) of the speech section data 11 may be determined based on voice activity information of each of the piece or pieces of unit speech section data included in the speech section data 11. According to the above description given with reference to FIG. 3, voice activity information data may be generated for each of the first unit speech section data 11*a*, the second unit speech section data 11*b*, and the third unit speech section data 11*c*. In this case, the voice activity information data may be generated by performing VAD on the unit speech section data.

In some embodiments, whether there is a voice activity in the speech section data 11 may be determined based on pieces of voice activity information generated for pieces of unit speech section data. For example, when the pieces of voice activity information satisfy a predetermined criterion, it may be determined that a voice activity is detected within the speech section data 11. For example, in the predetermined criterion, each of the pieces of voice activity information data may be higher than a predetermined value. For example, when all of the pieces of voice activity information data have a voice activity probability of 50% or more, it may be determined that the voice activity is detected in the speech section data 11. For another example, in the predetermined criterion, the average of the voice activity information data may be higher than a predetermined value. For example, when the average of the voice activity information data has the voice activity probability of 50% or more, it may be determined that the voice activity is detected in the speech section data 11.

In some embodiments of the present disclosure, a streaming technique may be used to implement a real-time nature of a synthesis speech detection method. In other words, under an actual usage environment, speech data may be divided into pieces of speech section data in a streaming method. Moreover, when the speech section data is divided, the speech section data may have an overlapping section by using a sliding window method. In this case, the time of each of the speech section data and the unit speech section data may be determined to be smaller than or equal to a predetermined value such that a synthesis speech detection method operates closer to real-time. Preferably, the length of unit speech section data may be set to 0.7 seconds or less, and the length of speech section data may be set to 2.1 seconds or less.

Figure 4:
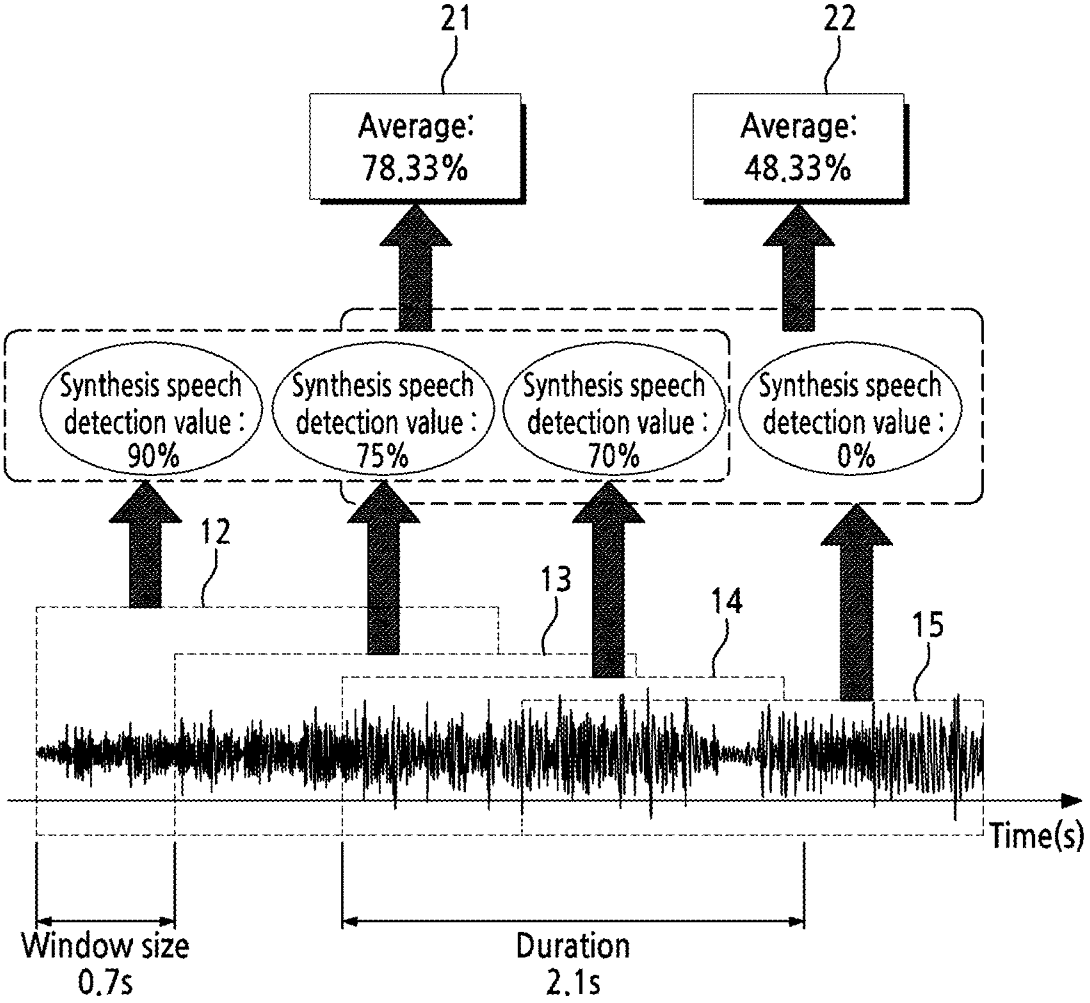
FIG. 4 is a conceptual diagram illustrating a process for detecting synthesis speech from speech section data, according to some embodiments of the present disclosure.

FIG. 4 is a conceptual diagram illustrating a process for detecting synthesis speech from speech section data, according to some embodiments of the present disclosure.

In some embodiments, input speech data may be divided into pieces of speech section data. As illustrated in FIG. 4, the entire input speech section may be divided into first input speech section data 12, second input speech section data 13, third input speech section data 14, and fourth input speech section data 15. As described above in FIG. 3, the pieces of first to fourth input speech section data 12 to 15 are composed of a piece or pieces of unit speech section data and may be speech section data in which a voice activity is detected.

In some embodiments of the present disclosure, synthesis speech detection data may be generated by using section synthesis detection data for each of the piece or pieces of input speech section data. As an example of the illustration in FIG. 4, the synthesis speech detection data of the input speech data may be determined by using all of section synthesis detection data for the first input speech section data 12, section synthesis detection data for the second input speech section data 13, and section synthesis detection data for the third input speech section data 14. For example, when the section synthesis detection data for the first input speech section data is 90% (i.e., the probability that the first speech section data is a synthesis speech is 90%), the section synthesis detection data for the second input speech section data is 75%, and the section synthesis detection data for the third input speech section data is 70%, first synthesis speech detection data 21 may be determined by using an average, a maximum value, and/or a minimum value thereof. In this case, when the first synthesis speech detection data 21 is greater than or equal to a predetermined value, the speech data may be determined to be synthesis speech.

In some embodiments of the present disclosure, final detection data may be generated over a speech data section by using a sliding window method and/or a movement average method. For example, second synthesis speech detection data 22 after the first synthesis speech detection data 21 may use the section synthesis detection data of each of the second input speech section data 13, the third input speech section data 14, and the fourth input speech section data 15 by using the sliding window method.

Even though there is some noise, silence, and/or noise in the speech data when the synthesis speech detection method is implemented in this way, the synthesis speech detection data may be robust against noise, silence, and/or noise by considering the speech data before and after the corresponding section.

Figure 5:
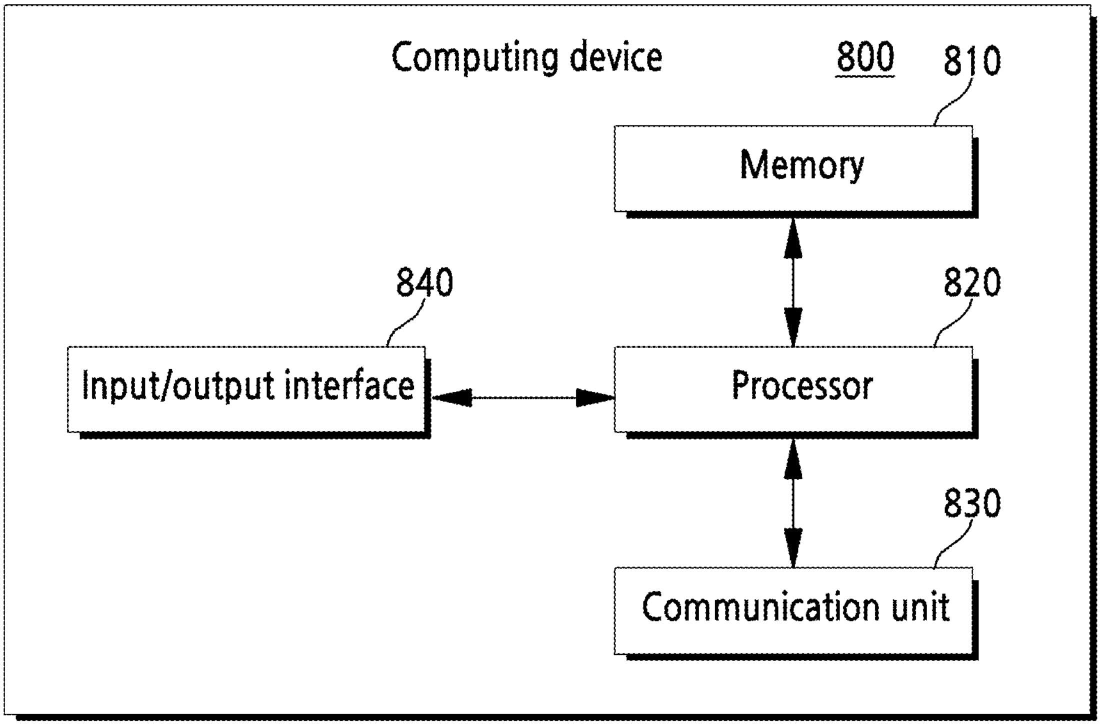
FIG. 5 is a block diagram showing a computing device for providing a synthesis speech detection method of the present disclosure.

FIG. 5 is a block diagram showing a computing device for providing a synthesis speech detection method of the present disclosure.

A computing device 800 may include a memory 810, a processor 820, a communication unit 830, and an input/output interface 840. As shown in FIG. 5, the computing device 800 may be configured to exchange information and/or data over a network by using the communication unit 830.

The memory 810 may include any computer-readable recording medium. According to an embodiment, the memory 810 may include a permanent mass storage device such as a random access memory (RAM), a read only memory (ROM), a disk drive, a solid state drive (SSD), a flash memory, or the like. For another example, the permanent mass storage device such as a ROM, a SSD, a flash memory, or a disk drive may be included in the computing device 800 as a permanent storage device separate from the memory. Moreover, an operating system and at least one program code may be stored in the memory 810.

These software components may be loaded from a computer-readable recording medium independent of the memory 810. Such the separate computer-readable recording medium may include a recording medium capable of being directly connected to the computing device 800, and may include, for example, a computer-readable recording medium such as a floppy drive, a disk, a tape, a DVD/CD-ROM drive, and a memory card. For another example, the software components may be loaded into the memory 810 through the communication unit 830, not the computer-readable recording medium. For example, at least one program may be loaded into the memory 810 based on a computer program installed by files provided by developers or a file distribution system, which distributes a file for installing an application, through the communication unit 830.

Here, the program may include program instructions, data files, data structures, etc. independently or may include a combination thereof. The program may be designed and produced by using machine codes or high-level language codes. The program may be specially designed to implement the above-described malicious application detection system, or may be implemented by using various functions or definitions known and available to those skilled in the art in a computer software field. The program for implementing the above-described malicious application detection system may be recorded on a readable recording medium by a processor.

The memory may store a program that performs the operations described above and operations described later, and the processor may execute the program stored in the memory. When there are a plurality of processors and a plurality of memories, they may be integrated into one chip, or they may be provided at physically separate locations. The memory may include a volatile memory such as a static random access memory (SRAM) and a dynamic random access memory (DRAM) for temporarily storing data. Moreover, the memory may include a nonvolatile memory such as a read only memory (ROM), an erasable programmable read only memory (EPROM), and an electrically erasable programmable read only memory (EEPROM) for long-term storage of control programs and control data.

The processor 820 may be configured to process instructions of a computer program by performing basic arithmetic, logic, and input and output operations. The instructions may be provided to another user terminal (not shown) or another external system by the memory 810 or the communication unit 830.

The processor may include various logic circuits and arithmetic circuits, may process data depending on the program provided from the memory, and may generate control signals depending on the processed result. At this time, the memory and the processor may be implemented as separate chips. Alternatively, the memory and the processor may be implemented as a single chip.

The processor 820 may include one or more processors. In this case, the one or more processors may be homogeneous or heterogeneous processors. For example, the processor 820 may include heterogeneous processors, including a central processing unit (CPU), a graphics processing unit (GPU), a tensor processing unit (TPU), and/or a neural processing unit (NPU). For convenience of description, the one or more homogeneous or heterogeneous processors may be represented as processor in this specification.

The communication unit 830 may provide a configuration or function that allows a user terminal (not shown) and the computing device 800 to communicate with each other over the network. The computing device 800 may provide a configuration or function for communicating with an external system (e.g., a separate cloud system, etc.). For example, control signals, commands, data, or the like provided under the control of the processor 820 of the computing device 800 may be transmitted to a user terminal and/or the external system through the communication unit of the user terminal and/or the external system via the communication unit 830 and a network.

Here, in addition to various wired communication units such as a local area network (LAN) module, a wide area network (WAN) module, or a value added network (VAN) module, the wired communication unit may include a variety of cable communication units such as universal serial bus (USB), high definition multimedia interface (HDMI), digital visual interface (DVI), recommended standard232 (RS-232), power line communication, or plain old telephone service (POTS).

Here, the wireless communication unit may include a wireless communication unit for supporting various wireless communication methods such as global system for mobile (GSM) communication, code division multiple access (CDMA), wideband code division multiple access (WCDMA), universal mobile telecommunication system (UMTS), time division multiple access (TDMA), long term evolution (LTE), 4G, 5G, and 6G in addition to a Wi-Fi module and a wireless broadband module.

The wireless communication unit may include a wireless communication interface including an antenna and a transmitter that transmit a Wi-Fi signal. Moreover, the wireless communication unit may further include a signal conversion module that modulates a digital control signal, which is output from a controller through the wireless communication interface, into an analog wireless signal under the control of the controller.

The wireless communication unit may include a wireless communication interface including an antenna and a receiver that receive the WiFi signal. Furthermore, the wireless communication unit may further include a WiFi signal conversion module for demodulating an analog wireless signal, which is received through the wireless communication interface, into a digital control signal.

The short-range communication unit may be used for short range communication, and may support short-range communication by using at least one of Bluetooth™, radio frequency identification (RFID), infrared data association (IrDA), ultra wideband (UWB), ZigBee, near field communication (NFC), Wireless-Fidelity (Wi-Fi), Wi-Fi Direct, and wireless universal serial bus (Wireless USB) technologies.

Moreover, the input/output interface 840 of the computing device 800 may be a means for interfacing with a device (not shown) for an input or an output, which is connected to the computing device 800 or is included in the computing device 800.

An input unit may be used to receive information and data including audio information (or signal), text, or the like from a network or a user, and may include at least one microphone and a user input unit. Data collected by the input unit may be analyzed and processed as a control command of the user.

A user input unit may be used to receive information from a user. When information is entered through the user input unit, the control unit may control operations of the apparatus to correspond to the input information. This user input unit may include a hardware-type physical key (e.g., a button, a dome switch, a jog wheel, or a jog switch that is located on at least one of the front, back, and sides of the apparatus) and a software-type touch key. For example, the touch key may consist of a virtual key, a soft key, or a visual key displayed on a touch screen-type display unit through software processing or may consist of a touch key positioned on a portion other than the touch screen. In the meantime, the virtual key or the visual key may be displayed on the touch screen while having various shapes. For example, the virtual key or visual key may be formed of graphics, texts, icons, video, or a combination thereof.

In FIG. 5, the input/output interface 840 is shown as an element configured separately from the processor 820, but is not limited thereto. For example, the input/output interface 840 may be configured to be included in the processor 820. The computing device 800 may include more components than those of FIG. 5. However, there is no need to clearly illustrate most conventional components.

The processor 820 of the computing device 800 may be configured to manage, process, and/or store information and/or data received from a plurality of user terminals and/or a plurality of external systems.

The above-described method and/or various embodiments may be implemented by digital electronic circuits, computer hardware, firmware, software, and/or a combination thereof. Various embodiments of the present disclosure may be implemented as a data processing device, for example, one or more programmable processors and/or one or more computing devices, or as a computer-readable recording medium and/or a computer program stored on the computer-readable recording medium. The computer program described above may be written in any programming language, including a compiled or interpreted language, and may be distributed in any form, such as a standalone program, module, subroutine, or the like. The computer program may be distributed through a single computing device, a plurality of computing devices connected through the same network, and/or a plurality of computing devices distributed to be connected through a plurality of different networks.

The above-described method and/or various embodiments may be performed by one or more processors configured to execute one or more computer programs that process, store and/or manage any function, function, or the like by operating based on input data or generating output data. For example, the method and/or various embodiments of the present disclosure may be performed by special purpose logic circuits such as a field programmable gate array (FPGA) or an application specific integrated circuit (ASIC), and a device and/or a system for performing the method and/or embodiments of the present disclosure may be implemented as a special purpose logic circuit such as an FPGA or an ASIC.

The one or more processors executing the computer program may include a general purpose or special purpose microprocessor and/or one or more processors of any type of a digital computing device. The processor may receive instructions and/or data from each of a read-only memory and a random access memory or may receive instructions and/or data from both the read-only memory and the random access memory. In the present disclosure, components of the computing device performing the method and/or embodiments may include one or more processors for executing instructions, and one or more memory devices for storing the instructions and/or the data.

According to an embodiment, the computing device may exchange data with one or more mass storage devices for storing data. For example, the computing device may receive data from a magnetic disk or an optical disc, and/or may transmit data to the magnetic disk or the optical disc. A computer-readable storage medium suitable for storing instructions and/or data associated with a computer program may include any form of a non-volatile memory including, but not limited to, a semiconductor memory device such as an erasable programmable read-only memory (EPROM), an electrically erasable PROM (EEPROM), and a flash memory device. For example, the computer-readable storage medium may include a magnetic disk (e.g., an internal hard disk or a removable disk), a magneto-optical disc, a CD-ROM disc, and a DVD-ROM disc.

To provide interaction with a user, the computing device may include, but is not limited to, a display device (e.g., a cathode ray tube (CRT), a liquid crystal display (LCD), or the like) for providing or displaying information to a user and a pointing device for allowing the user to provide inputs and/or commands to the computing device. In other words, the computing device may further include any other types of devices for providing interaction with the user. For example, to interact with the user, the computing device may provide the user with any form of sensory feedback including visual feedback, auditory feedback, and/or tactile feedback. In this regard, the user may provide an input to the computing device through various gestures such as vision, speech, and movement.

In the present disclosure, various embodiments may be implemented in the computing system including a backend component (e.g., a data server), a middleware component (e.g., an application server) and/or a front-end component. In this case, the components may be interconnected by a medium or any form of digital data communication such as a communications network. For example, the communication network may include a local area network (LAN), a wide area network (WAN), or the like.

The computing device based on embodiments described in this specification may be implemented by using hardware and/or software configured to interact with the user by including a user device, a user interface (UI) device, a user terminal, or a client device. For example, the computing device may include a portable computing device such as a laptop computer. Additionally or alternatively, the computing device may include, but is not limited to, personal digital assistants (PDA), a tablet PC, a game console, a wearable device, an internet of things (IoT) device, a virtual reality (VR) device, an augmented reality (AR) device, and the like. The computing device may further include other types of devices configured to interact with the user. Besides, the computing device may include a portable communication device (e.g., a mobile phone, a smart phone, a wireless cellular phone, or the like) suitable for wireless communication over a network such as a mobile communication network. The computing device may be configured to wirelessly communicate with a network server by using protocols and/or wireless communication technologies, such as a radio frequency (RF), a microwave frequency (MWF), and/or an infrared ray frequency (IRF).

In an embodiment of the present disclosure, functions related to artificial intelligence may be implemented through a processor and a memory. In this case, the processor may be one of a general-purpose processor such as a center processing unit (CPU), an application processor (AP), a digital signal processor (DSP), a graphics-dedicated processor such as a graphic processing unit (GPU), a vision processing unit (VPU), and an AI-dedicated processor such as a neural network processing unit (NPU). The processor may process input data depending on an AI model or a predefined operating rule, which is stored in the memory. Alternatively, when the processor is an AI-dedicated processor, the AI-dedicated processor may be designed with a hardware structure specialized for the processing of a specific AI model. In some embodiments of the present disclosure, functions related to artificial intelligence may be implemented through a plurality of processors.

In an embodiment of the present disclosure, the predefined operating rule or the artificial intelligence model may be configured to perform machine learning. Here, being configured to perform machine learning means that the predefined operation rule or the artificial intelligence model is configured to perform a desired feature (or purpose) by learning pieces of learning data based on a learning algorithm. This learning may be performed by a device itself, on which the artificial intelligence according to an embodiment of the present disclosure is implemented, or may be performed through a separate server and/or system.

The artificial intelligence model may be implemented with a neural network (or an artificial neural network) and may operate based on a statistical learning algorithm that mimics biological neurons in machine learning and cognitive science. The neural network may refer to a model as a whole having the ability to solve problems as artificial neurons (nodes), which form a network by connecting synapses, changes the strength of their synaptic connections through learning. The neural network may be composed of a plurality of neural network layers. For example, the neural network may include an input layer, a hidden layer, and an output layer. Each of the plurality of neural network layers may include at least one node and at least one weight, and may perform neural network operations through operations between weights and the operation results of the previous layer. At least one weight of the plurality neural network layers may be optimized by the training result of the artificial intelligence model. For example, during the training process, the at least one weight may be updated such that a loss value or cost value obtained from the artificial intelligence model is reduced or minimized. The neural network may infer the desired result from an arbitrary input.

Training methods of the artificial intelligence model may be classified into supervised learning, in which input data and output data are provided as training data according to the learning method, and the correct answer (output data) corresponding to the problem (input data) is determined, unsupervised learning, in which only the input data is provided without the output data, and the correct answer (output data) corresponding to the problem (input data) is not determined, reinforcement learning, in which a reward is given whenever an action is taken in a current state, and training proceeds to maximize the reward, and the like. Alternatively, the training methods may be distinguished based on the architecture, which is the structure of the learning model.

According to an embodiment of the present disclosure, the artificial intelligence model may use at least one of various artificial intelligence structures and algorithms such as a convolution neural network (CNN) (e.g., GoogleNet, AlexNet, or VGG Network), a region with convolution neural network (R-CNN), a region proposal network (RPN), a recurrent neural network (RNN), a stacking-based deep neural network (S-DNN), a state-space dynamic neural network (S-SDNN), a deconvolution network, a deep belief network (DBN), a restricted Boltzman machine (RBM), a fully convolutional network, a long short-term memory (LSTM) Network, a classification network, Generative Modeling, explainable AI, Continual AI, Representation Learning, AI for Material Design, algorithms for natural language processing (e.g., BERT, SP-BERT, MRC/QA, Text Analysis, Dialog System, GPT-3, and GPT-4), algorithms for vision processing (e.g., Visual Analytics, Visual Understanding, Video Synthesis, and ResNet), algorithms for data intelligence (e.g., Anomaly Detection, Prediction, Time-Series Forecasting, Optimization, Recommendation, and Data Creation), but is not limited thereto. The above-described examples are merely illustrative of artificial intelligence structures and algorithms used in accordance with embodiments of the present disclosure, and do not limit the artificial intelligence structures and algorithms used in accordance with embodiments of the present disclosure.

Meanwhile, embodiments disclosed in the specification may be implemented in a form of a recording medium storing instructions executable by a computer. The instructions may be stored in a form of program codes, and, when executed by a processor, generate a program module to perform operations of the disclosed embodiments. The recording medium may be implemented as a computer-readable recording medium. The computer-readable recording medium includes all kinds of recording media in which instructions capable of being decoded by a computer are stored. For example, there may be a ROM, a RAM, a magnetic tape, a magnetic disk, a flash memory, an optical data storage device, or the like.

The above description refers to detailed embodiments for implementing the present disclosure. The present disclosure may include embodiments in which a design is changed simply or which are easily changed, as well as the embodiments described above. In addition, the present disclosure may include technologies that are easily changed and implemented by using the above-described embodiments.

In the present disclosure, various embodiments including specific structural and functional details are illustrative. Accordingly, embodiments of the present disclosure are not limited to those described above and may be implemented in various other forms. Moreover, the terminology used in the present disclosure is for the purpose of describing some embodiments and is not to be construed as limiting an embodiment. For example, unless the context clearly indicates otherwise, "words in the singular" and "the/said"may be construed to include the plural.

In the present disclosure, unless otherwise defined, all terms used in this specification, including technical or scientific terms, have the same meaning as commonly understood by a person of ordinary skill in the art to which such concepts belong. Furthermore, commonly used terms, such as dictionary-defined terms, should be interpreted to have a meaning consistent with their meaning in the context of the relevant art.

Although the present disclosure has been described herein in connection with some embodiments, it should be understood that various modifications and changes may be made without departing from the scope of the present disclosure as understood by those skilled in the art to which the present disclosure pertains. Moreover, such modifications and variations are intended to fall within the scope of claims appended hereto.

According to the synthesis speech detection method according to an embodiment of the present disclosure, synthesis speech such as a deepfake may be detected in real time on edge devices or end-user devices such as smartphones having computing resources of a limited level.

Effects according to the present disclosure are not limited to the effects mentioned above, and other effects not mentioned will be clearly understood by those skilled in the art from the following description.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A method of training a synthesis speech detection model performed by one or more processors, the method comprising:

generating a student model initialized by using at least part of one or more teacher model layers included in a teacher model;

inputting learning speech data into the teacher model and the student model;

generating teacher extraction data from the teacher model and student extraction data from the student model; and training the student model based on the teacher extraction data and the student extraction data, wherein for detecting synthesized speech in real time on one device which has computing resources less than a predetermined threshold, the generating of the student model includes:

initializing a weight of at least one student model layer included in the student model to a weight of at least one corresponding teacher model layer, acoustic features are extracted from layers forming a part of a front end of the teacher model, the student model for processing the acoustic features is constructed by initializing the part of the front end layer of the teacher model to the student model, the student model has a number of layers fewer than the teacher model, and the number of student model layers included in the student model is smaller than or equal to ¼ of a number of teacher model layers included in the teacher model.

2. The method of claim 1, wherein the teacher extraction data includes one or more teacher model layer embeddings and teacher model detection data, and wherein the student extraction data includes one or more student model layers embeddings and student model detection data.

3. The method of claim 2, wherein the training of the student model includes:

generating a loss function value for the learning speech data, and wherein the loss function value is determined based on similarity between the one or more teacher model layer embeddings and corresponding student model layer embeddings and similarity between the teacher model detection data and the student model detection data.

4. The method of claim 3, wherein the similarity between the one or more teacher model layer embeddings and corresponding student model layer embeddings includes L1-norm or L2-norm.

5. The method of claim 3, wherein the similarity between the teacher model detection data and the student model detection data includes a knowledge distillation loss between the teacher model detection data and the student model detection data.

6. The method of claim 3, wherein the similarity between the one or more teacher model layer embeddings and corresponding student model layer embeddings includes a cosine similarity.

7. The method of claim 1, further comprising:

determining a student model, whose training is completed by the training of the student model, as the synthesis speech detection model.

8. A synthesis speech detection system, the system comprising:

a synthesis speech detecting device; and a synthesis speech detection model training device, wherein the synthesis speech detecting device includes:

a first processor;

a first display; and a first memory including a pre-trained synthesis speech detection model, wherein the first processor is configured to:

generate synthesis speech detection data of input speech data by using the pre-trained synthesis speech detection model; and allow the generated synthesis speech detection data to be displayed through the first display, wherein for detecting synthesized speech in real time on one device which has computing resources less than a predetermined threshold, the generating of the synthesis speech detection data by the first processor includes:

generating pieces of input speech section data by dividing the input speech data in a sliding window method;

generating pieces of section synthesis detection data for the pieces of input speech section data, respectively; and generating synthesis speech detection data of the input speech data by using a movement average of the generated pieces of section synthesis detection data, the synthesis speech detection model training device includes:

a second processor; and a second memory including a teacher model and a student model, the second processor is configured to:

generate the student model initialized by using at least part of one or more teacher model layers included in the teacher model;

input learning speech data into the teacher model and the student model;

generate teacher extraction data from the teacher model and student extraction data from the student model; and train the student model based on the teacher extraction data and the student extraction data, the second processor is further configured to:

initialize a weight of at least one student model layer included in the student model to a weight of at least one corresponding teacher model layer, acoustic features are extracted from layers forming a part of a front end of the teacher model, the student model for processing the acoustic features is constructed by initializing the part of the front end layer of the teacher model to the student model, the student model has a number of layers fewer than the teacher model, the number of student model layers included in the student model is smaller than or equal to ¼ of a number of teacher model layers included in the teacher model, and the pre-trained synthesis speech detection model is processed in an end-to-end manner within the synthesis speech detecting device composing of a single device.

9. The system of claim 8, wherein the generating of the synthesis speech detection data by the first processor further includes:

dividing the input speech data into input speech section data including a piece or pieces of unit speech section data;

generating unit section voice activity data for each of the piece or pieces of unit speech section data; and detecting a voice activity of the input speech section data by using the piece or pieces of unit speech section data, wherein only the input speech section with which the voice activity detected is input to the teacher model and the student model.

10. The system of claim 9, wherein a length of the unit speech section data is 0.7 seconds or less.

11. The system of claim 8, wherein a length of the input speech section data is 2.1 seconds or less.

* * * * *